United States Patent
Harmon et al.

(10) Patent No.: US 7,313,416 B1
(45) Date of Patent: Dec. 25, 2007

(54) SCALABLE POWER AMPLIFIER

(75) Inventors: Clayton Harmon, Cedar Rapids, IA (US); Allen W. Jones, Cedar Rapids, IA (US); Russell W. Barta, Marion, IA (US); James L. Barlett, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 210 days.

(21) Appl. No.: 10/931,758

(22) Filed: Sep. 1, 2004

(51) Int. Cl.
*H04M 1/00* (2006.01)

(52) U.S. Cl. ............... 455/562.1; 455/550.1; 455/552.1; 455/553.1; 455/98; 455/127.1; 455/234.2; 455/232.1; 370/133; 370/278; 375/297; 343/850

(58) Field of Classification Search ............ 455/550.1, 455/552.1, 553.1, 98, 127.1, 234.2, 232.1, 455/562.1; 375/297; 330/133, 278; 343/850
See application file for complete search history.

(56) References Cited

U.S. PATENT DOCUMENTS

| | | | | |
|---|---|---|---|---|
| 4,598,252 A | * | 7/1986 | Andricos | 330/51 |
| 5,204,637 A | * | 4/1993 | Trinh | 330/129 |
| 5,304,998 A | | 4/1994 | Lopez | 343/767 |
| 5,809,408 A | * | 9/1998 | Fujimoto et al. | 455/234.2 |
| 5,834,975 A | * | 11/1998 | Bartlett et al. | 330/278 |
| 5,939,939 A | * | 8/1999 | Gaynor et al. | 330/124 R |
| 6,046,655 A | | 4/2000 | Cipolla | 333/137 |
| 6,222,480 B1 | * | 4/2001 | Kuntman et al. | 342/30 |
| 6,362,685 B1 | | 3/2002 | Vagher | 330/124 R |
| 6,608,602 B2 | * | 8/2003 | Waltho et al. | 343/850 |
| 6,737,914 B2 | * | 5/2004 | Gu | 330/2 |
| 6,782,244 B2 | * | 8/2004 | Steel et al. | 455/127.1 |
| 6,791,407 B2 | * | 9/2004 | Grebennikov et al. | 330/133 |
| 6,954,623 B2 | * | 10/2005 | Chang et al. | 455/127.1 |
| 2003/0179832 A1 | * | 9/2003 | Greenwood et al. | 375/297 |
| 2003/0179833 A1 | * | 9/2003 | Porco et al. | 375/297 |

OTHER PUBLICATIONS

"Wilkinson power splitters," available @ http://www.microwaves101.com/encyclopedia/Wilkinson_splitters.cfm, pp. 1-9 (available at least by Aug. 3, 2004).

* cited by examiner

*Primary Examiner*—Steve M. D'Agosta
(74) *Attorney, Agent, or Firm*—Nathan O. Jensen; Kyle Eppele

(57) ABSTRACT

A power amplifier for a dual antenna is disclosed. The power amplifier comprises at least four controlled amplifier loops receiving a signal to be transmitted. The power amplifier also comprises a first combining structure combining at least two of the amplifier loops and a second combining structure combining at least two of the amplifier loops. The power amplifier also comprises a ninety degree hybrid receiving output from the first and second combining structures and providing output to a first antenna output and a second antenna output.

23 Claims, 4 Drawing Sheets

SCALABLE POWER AMPLIFIER

BACKGROUND

The application relates generally to radio communications and more specifically to multi-level power amplifiers used in radio frequency (RF) communications transmitting equipment which may use dual antennas.

RF power amplifiers are conventionally used in military and commercial applications to increase transmitted power levels to meet communication system requirements. Many applications require multiple power levels due to differing transmit range requirements, and other requirements. Some applications require an RF power amplifier to operate at multiple power levels such as high, medium, and low. Further, some systems require the use of dual antenna capabilities. For example, on aircraft mounted radios, a first antenna may be located on top of the vehicle and a second antenna may be located on the bottom of the vehicle. It may be desirable to radiate signals from either of or both of the antennas in the event of maneuvers, rolling, to keep the communication link going. In splitting the signal between multiple antennas, there are often problems encountered in balancing the split feed to those antennas.

Accordingly, there is a need for a system which provides fine control, or articulate control of the power on both antennas in order to maintain the specified bit error rates, etc. Further, there is a need for a fine control of power to multiple antennas which would maintain link margins at specified levels.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

What is provided is a power amplifier for a dual antenna. The power amplifier comprises at least four controlled amplifier loops receiving a signal to be transmitted. The power amplifier also comprises a first combining structure combining at least two of the amplifier loops and a second combining structure combining at least two of the amplifier loops. Further, the power amplifier comprises a ninety degree hybrid receiving output from the first and second combining structures and providing output to a first antenna output and a second antenna output.

What is also provided is a method of providing an amplified antenna signal to a dual antenna structure. The method comprises providing a signal to at least four controlled amplifier loops. The method also comprises combining signals from at least two of the amplifier loops with a first combining structure and combining signals from at least two of the amplifier loops with a second combining structure. Further, the method comprises receiving output from the first and second combining structures by a 90 degree hybrid. Further still, the method comprises providing output to a first antenna output and a second antenna output from the ninety degree hybrid.

What is further provided is a power amplifier for a dual antenna structure. The power amplifier comprises a means for providing a signal to at least four controlled amplifier loops. The power amplifier also comprises a means for combining signals from at least two of the amplifier loops with a first combining structure and a means for combining signals from at least two of the amplifier loops with a second combining structure. Further, the power amplifier comprises a means for receiving output from the first and second combining structures by a 90 degree hybrid. Further still, the power amplifier comprises a means for providing output to a first antenna output and a second antenna output from the ninety degree hybrid.

Alternative examples and other exemplary embodiments may also be provided which relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED AND EXEMPLARY EMBODIMENTS

Figure 1:
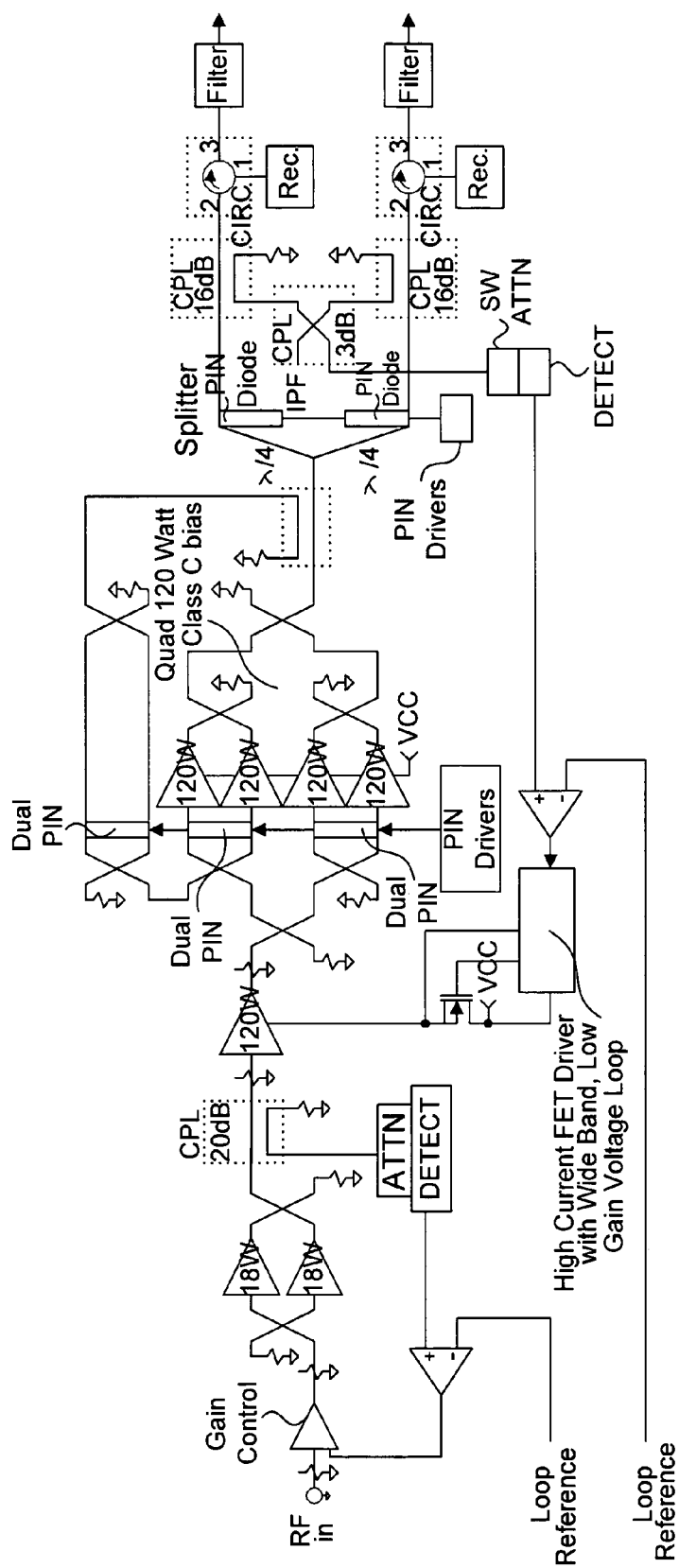
FIG. 1 is an exemplary diagram of a dual antenna circuit of the prior art.

Before describing in detail the particular improved system and method, it should be observed that the invention includes, but is not limited to a novel structural combination of conventional data/signal processing components and communication circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of this description herein. Further, the invention is not limited to the particular embodiments depicted in the exemplary diagrams, but should be construed in accordance with the language in the claims.

Conventionally, radiated radio frequency (RF) power control at the antenna ports of a typical L-band transmitter has less than plus or minus 1 db power variation requirements. The low volume terminal power amplifier input has a dual antenna mode where power must be split evenly for simultaneous upper and lower antenna transmission. Depicted in FIG. 1 is a dual antenna circuit of the prior art including a pin diode switching arrangement, which may be disadvantageous. Accordingly, it is advantageous to implement a circuit in which the power is controlled between the two transmitting antennas. Another difficult problem with conventional systems is that the present techniques use either switch paths or switched attenuation at the output. Multi-mode power amplifiers for new and emerging systems require fast switching agile loops that can quickly change pulse shapes and power levels. However, there are, at present, no digitally tunable controls for adjusting the relative power of the two antenna ports, when in dual transmission mode. PCB fabrication, vendor device variations, assembly variations, and detector thermal variations all contribute to path power variations. These variations can only be adjusted by manual test selects or component swapping in conventional systems.

Figure 2:
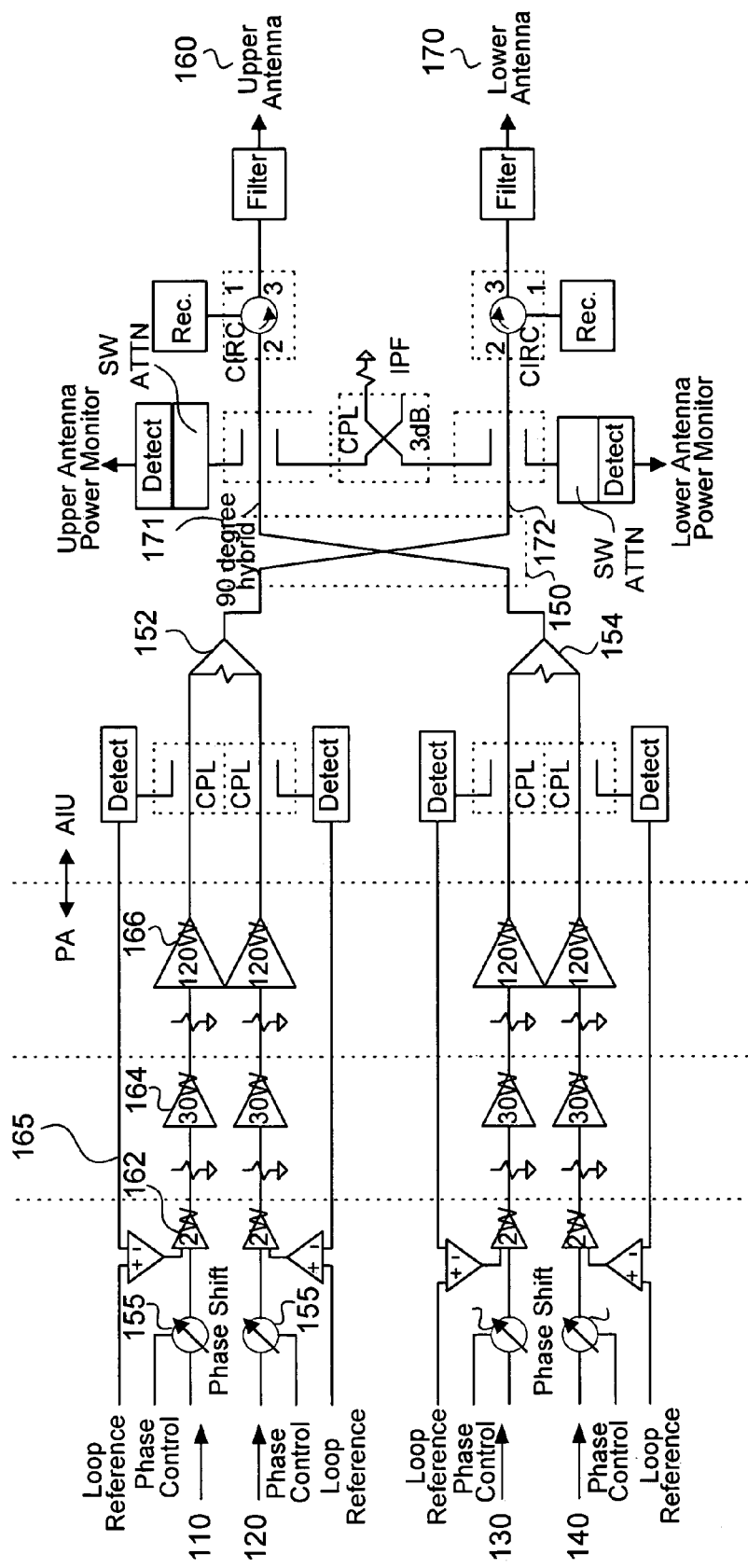
FIG. 2 is an exemplary diagram of a circuit in accordance with the disclosure.

Thus, it is desirable to provide an antenna path selection (dual or either single) using four parallel RF paths 110, 120, 130, and 140 as depicted in FIG. 2. This technique provides antenna power steering with phase shifts of the amplifiers paths feeding the final ninety degree hybrid 150. Overall output power control is achieved by relative phase shift of the amplifier pairs feeding combination structures. The outputs are to upper antenna 160 and lower antenna 170 in accordance with an exemplary embodiment. Fine relative phase control allows fine relative amplitude control of the split power antenna outputs 160 and 170. In accordance with an exemplary embodiment, a 6.5 degree phase shift may adjust the relative output power by 1 dB. In accordance with the invention, the architecture allows fine resolution of power control that is limited only by the dissipation limits of the Wilkinson balance resistors in the Wilkinson combiners 152 and 154 and resolution of the phase shifters 155. This dissipation can be reduced if loop control power reduction is used. In accordance with an alternative embodiment Wilkinson combiners 152 and 154 may be replaced with ninety degree hybrids.

In a situation with an upper antenna 160 and a lower antenna 170, it is desirable not only to maintain precise control of power on each antenna port, but it is desirable to have tight output power requirements at multiple power levels. Such power levels may be attained in a variety of ways including, but not limited to those disclosed in U.S. Pat. No. 6,362,685 which is herein incorporated by reference. In the exemplary embodiment depicted in FIG. 2, the four parallel amplifier paths having amplifiers 162, 164, and 166 are provided in closed loop format in which the closed loop 165 is a power control loop. In an exemplary embodiment, the 120-watt amplifier 166 is a non-linear power in/power out amplifier. Two of the paths, for example 110 and 120 are combined by a Wilkinson combiner 152. Similarly, paths 130 and 140 are combined with a combiner 154. The outputs of combiners 152 and 154 are provided to the ninety degree hybrid 150. Hybrid 150 is a passive four-port coupler with specific characteristics that are used to advantage in the present invention. The hybrid 150 may also be referred to as a splitter or a combiner depending on its application. The typical hybrid such as 150 includes two input ports and two output ports. If a signal is impressed upon the port from input 152, it is split and half the power is sent to output port 171 and half is sent to output port 172. The power available at ports 171 and 172 may be transformed. Additionally, the phase of the signals of these ports differs by ninety degrees.

Figure 3:
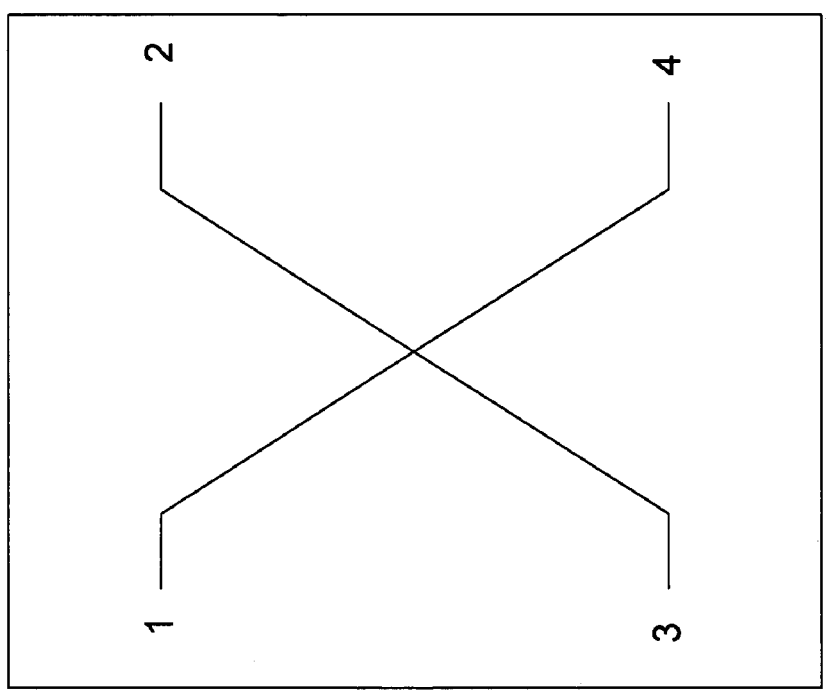
FIG. 3 is a reference diagram for the ninety degree hybrid.

A trigonometric representation of the voltage waveform translated from the inputs to the outputs of the hybrid depicted in FIG. 3 is as follows:

port1=A*SIN(a)    port2=.7071*A*SIN(a)+.7071*B*SIN(b+90)
port3=B*SIN(b)    port4=.7071*A*SIN(a+90)+.7071*B*SIN(b)
Case 1: assume A=B and a+b and (.7071*A)=C
Then 2=C*(SIN(a)+SIN(a+90) =
C*2*(SIN((a+a+90)/2)*COS((a−a−90)/2))
or       port2=C*1.4142*SIN(a+45) = A*SIN(a+45)
Similarly   port4=A*SIN(a+45)
Case 2: assume A=B and b=(a+90) and (.7071*A)=C -continued A similar algebra process renders
port2=0
port4=1.4142*A*SIN(a+90)

The advantages provided by the power amplifier architecture includes but is not limited to wide dynamic range and fine resolution of power control with a combination of loop amplitude adjustment and parallel amplifier phase shifting. The circuit allows a wide range of power control even with non-linear biased output devices. Further, the architecture allows scaling of power by adding layers of large stages. Further still, the circuit provides independent phase and amplitude control of the input signal and allows digital control phase and amplitude of the antenna outputs (auto tune capability). Further still, the architecture requires no pin diodes in high power switch positions and fewer bandwidth limiting hybrid structures. Yet further still, the architecture provides a more constant impedance to the power amplifier final transistors than the existing dual/single AIU input impedance compromise. The structure is also redundant (parallel amplifiers) and therefore provides a higher reliability transmitter for the customer with more graceful degradation. The architecture also provides high efficiency due to a lack of switching in high power paths and constant impedances at the high power device ports.

Figure 4:
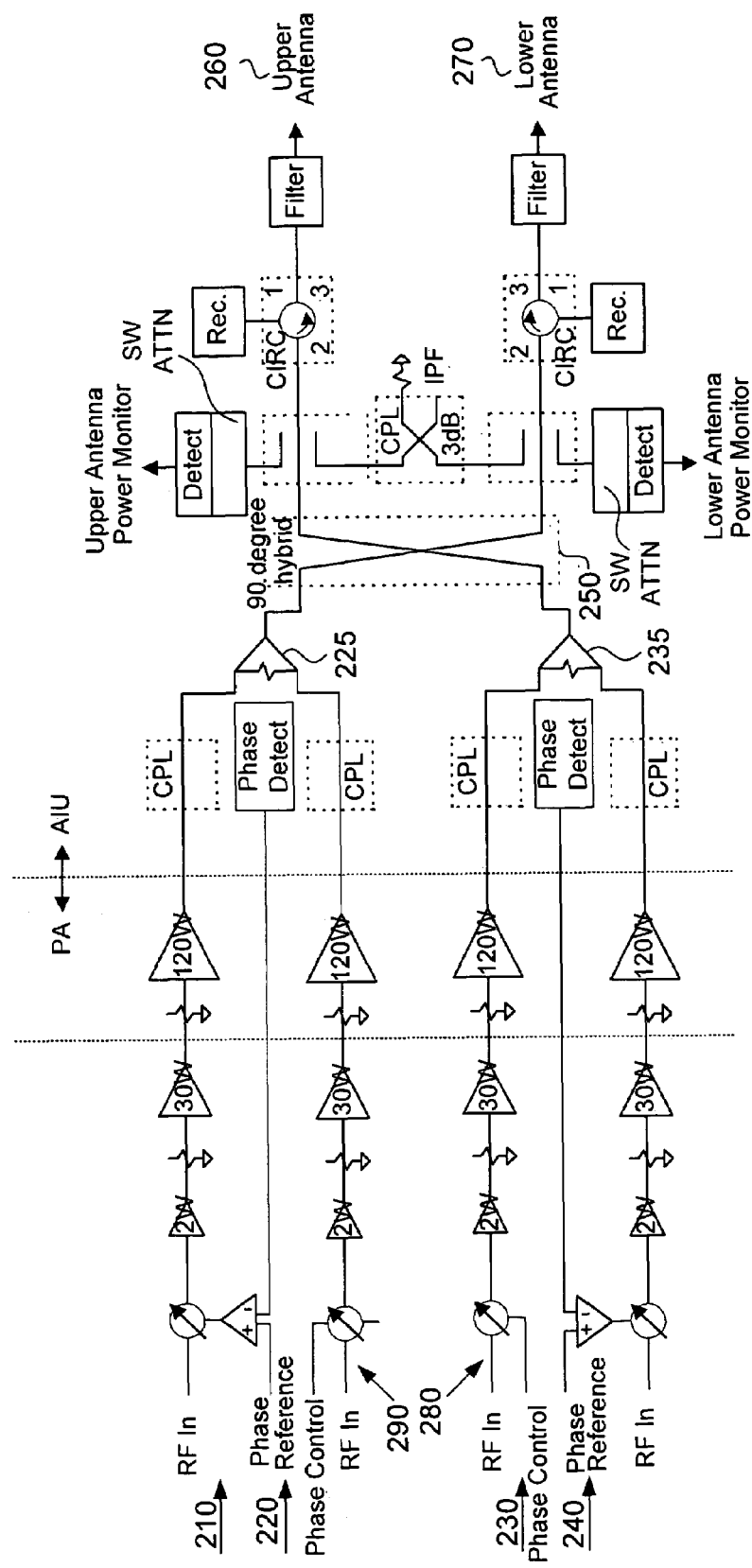
FIG. 4 is another exemplary embodiment of a circuit in accordance with the disclosure.

Current circuits to achieve pulse modulation require many parts, consume considerable power, and frequently require individual hand tuning to achieve the desired pulse output characteristics. Therefore, an alternative circuit is desired to alleviate these problems. In an exemplary embodiment, the antenna path selection (dual or either single) using four parallel RF paths is depicted in the block diagram of FIG. 4. The technique provides antenna power steering with phase shifts of the amplifier paths 210, 220, 230, and 240 feeding the final ninety degree hybrid 250. Overall output power control is achieved by relative phase shift of the amplifier pair paths feeding the combining structures 225 and 235. Fine relative phase control allows fine relative amplitude control of the split power antenna outputs 260 and 270. In accordance with an exemplary embodiment, a 6.5 degrees phase shift adjusts the relative output power by 1 dB. The same circuitry may be used to provide pulse modulation with a wide dynamic range eliminating the need for high power modulation parts. If phase shifters are fast enough, pulse control may be achieved purely by phase control, which is shown in the phase control loops 280 and 290.

While the detailed drawings, specific examples, and particular formations given describe preferred and exemplary embodiments, they serve the purpose of illustration only. The inventions disclosed are not limited to the specific forms shown. For example, the hardware configurations shown and described may differ depending on the chosen performance characteristics and physical characteristics of the communication devices. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A power amplifier for a dual antenna disposed on an aircraft, the power amplifier comprising:

at least four controlled amplifier loops receiving a signal to be transmitted, each of the at least four controlled amplifier loops providing a controlled loop signal;

a first combining structure combining the controlled loop signals provided by at least a first two of the amplifier loops;

a second combining structure combining the controlled loop signals provided by at least a second two of the amplifier loops;

a ninety degree hybrid receiving output from the first and second combining structures and providing output to a first antenna output for a first aircraft antenna associated with the dual antenna and a second antenna output for a second aircraft antenna associated with the dual antenna; and phase shifters associated with the controlled amplifier loops to control the phase of the controlled loop signals provided to the first combining structure and the second combining structure, the phase shifters thereby affecting the output from the first and second combining structures and received by the ninety degree hybrid, each phase shifter receiving a phase control signal from a control for adjusting the power provided to the first aircraft antenna relative to the second aircraft antenna; whereby the architecture of the power amplifier provides a dynamic range above 30 dB and a resolution of power control of less than 1 dB in an aircraft environment.

2. The power amplifier of claim 1, wherein the controlled amplifier loops comprise more than one power amplifier.

3. The power amplifier of claim 2, wherein at least one of the power amplifiers is a nonlinear power amplifier.

4. The power amplifier of claim 1, wherein the first combining structure and the second combining structure comprise Wilkinson combiners.

5. The power amplifier of claim 1,
wherein the first aircraft antenna is a lower aircraft antenna and the second aircraft antenna is an upper aircraft antenna.

6. A power amplifier for a dual antenna disposed on an aircraft, the power amplifier comprising:

at least four controlled amplifier loops receiving a signal to be transmitted the controlled amplifier loops comprising at least one power amplifier;

a first combining structure combining at least a first two of the amplifier loops;

a second combining structure combining at least a second two of the amplifier loops; and a ninety degree hybrid receiving output from the first and second combining structures and providing output to a first antenna output for a first aircraft antenna associated with the dual antenna and a second antenna output for a second aircraft antenna associated with the dual antenna, whereby the architecture of the power amplifier provides a dynamic range above 30 dB and a resolution of power control of less than 1 dB in an aircraft environment, wherein at least one of the power amplifiers is a nonlinear power amplifier, wherein the first combining structure and the second combining structure comprise Wilkinson combiners, and wherein the first aircraft antenna is a lower aircraft antenna and the second aircraft antenna is an upper aircraft antenna.

7. The power amplifier of claim 6, wherein independent control of the phase and amplitude of the controlled amplifier loops is provided.

8. The power amplifier of claim 6, wherein the at least four controlled amplifier loops control phase.

9. The power amplifier of claim 6, wherein the first combining structure and the second combining structure comprise ninety degree hybrids.

10. A method of providing an amplified antenna signal to a dual antenna structure including a first aircraft antenna and a second aircraft antenna disposed on an aircraft, the method allowing fine resolution of power control in an aircraft environment, the method comprising:

providing a signal to at least four controlled amplifier loops;

combining signals from at least a first two of the amplifier loops with a first combining structure;

combining signals from at least a second two of the amplifier loops with a second combining structure;

receiving output from the first and second combining structures by a ninety degree hybrid;

providing output from the ninety degree hybrid to a first antenna output for the first aircraft antenna associated with the dual antenna;

providing output from the ninety degree hybrid to a second antenna output for the second aircraft antenna associated with the dual antenna; and controlling the power provided to the first aircraft antenna relative to the second aircraft antenna by tuning the phase shifts provided by the at least four controlled amplifier loops, each of the at least four controlled amplifier loops including a phase shifter.

11. The method of claim 10, further comprising:
controlling the phase of the controlled loop signals.

12. The method of claim 10, further comprising:
controlling the phase and amplitude of the controlled loop signals.

13. The method of claim 10, wherein at least one of the power amplifiers is a nonlinear power amplifier.

14. The method of claim 10, wherein the first combining structure and the second combining structure comprise Wilkinson combiners.

15. The method of claim 10,
wherein the first aircraft antenna is a lower aircraft antenna and the second aircraft antenna is an upper aircraft antenna.

16. The method of claim 10, wherein the first combining structure and the second combining structure comprise ninety degree hybrids.

17. A power amplifier for use on an aircraft, the power amplifier being for use with a dual antenna structure including a first aircraft antenna and a second aircraft antenna disposed on the aircraft, comprising:

means for providing a signal to at least four controlled amplifier loops, the at least four controlled amplifier loops outputting controlled loop signals;

means for combining the controlled loop signals from at least two of the amplifier loops with a first combining structure;

means for combining the controlled loop signals from at least two of the amplifier loops with a second combining structure;

means for receiving output from the first and second combining structures by a ninety degree hybrid;

means for providing output to a first antenna output coupled to the first aircraft antenna and a second antenna output coupled to the second aircraft antenna from the ninety degree hybrid; and means for tuning the phase of the controlled loop signals to control the power provided to the first aircraft antenna relative to the second aircraft antenna;

wherein the architecture of the power amplifier provides a dynamic range of more than 30 dB and a resolution of power control of less than 1 dB in an aircraft environment.

18. The power amplifier of claim 17, wherein the means for tuning the phase includes a digitally tunable control.

19. The power amplifier of claim 17, further comprising:

a means for controlling the amplitude of the controlled loop signals.

20. The power amplifier of claim 17, wherein at least one of the power amplifiers is a nonlinear power amplifier.

21. The power amplifier of claim 17, wherein the first combining structure and the second combining structure comprise Wilkinson combiners.

22. The power amplifier of claim 17, wherein the first aircraft antenna is a lower aircraft antenna and the second aircraft antenna is an upper aircraft antenna.

23. The power amplifier of claim 17, wherein the first combining structure and the second combining structure comprise ninety degree hybrids.

* * * * *